United States Patent [19]
Leonard et al.

[11] Patent Number: 5,181,422
[45] Date of Patent: Jan. 26, 1993

[54] DIAPHRAGM TYPE FLUID PRESSURE GAUGE

[75] Inventors: Robert F. Leonard, Trumbull; Carl J. Styckiewicz, Meridan, both of Conn.

[73] Assignee: Dresser Industries, Inc., Dallas, Tex.

[21] Appl. No.: 738,191

[22] Filed: Jul. 30, 1991

[51] Int. Cl.⁵ .............................................. G01L 7/08
[52] U.S. Cl. ..................................... 73/715; 73/431
[58] Field of Search ................ 73/715, 756, 706, 708, 73/431, 716, 732, 146.8, 299, 300, 727

[56] References Cited

U.S. PATENT DOCUMENTS

| | | | |
|---|---|---|---|
| 3,543,586 | 12/1970 | Waite | 73/756 |
| 3,795,148 | 3/1974 | Luich | 73/431 |
| 4,589,287 | 5/1986 | Dickens | 73/727 |

Primary Examiner—Donald O. Woodiel
Attorney, Agent, or Firm—Hubbard, Thurman, Tucker & Harris

[57] ABSTRACT

A diaphragm type fluid pressure gauge comprises a case formed of an injection molded thermoplastic. The bottom wall of the case selectively defines a rear axial fluid connection or a radial fluid connection to a fluid chamber defined within the case. The fluid chamber is closed by a diaphragm which is clamped against an annular radial surface in the case by a thermoplastic ring which is melt-welded to the case. The other face of the ring provides a mounting for a movement mechanism for driving a pointer in response to axial displacement of the diaphragm.

12 Claims, 4 Drawing Sheets

DIAPHRAGM TYPE FLUID PRESSURE GAUGE

FIELD OF THE INVENTION

The invention relates to a diaphragm type fluid pressure gauge for measuring and indicating modest pressures above and below ambient pressures, and particularly to an improved configuration of the case and other structural elements of the gauge permitting the utilization of molded thermoplastic material.

SUMMARY OF THE PRIOR ART

Fluid pressure gauges utilizing a flexible diaphragm subjected to ambient pressure on one side and the pressure (or vacuum) to be measured on the other side, have long been known in the art. Because many of the fluid pressures being measured involve fluids that are corrosive, it has been the common practice to form the case and other structural parts of the pressure gauge from brass or similar corrosion resistant metals. It is, of course, desirable to produce a single configuration of the case for a specific size of diaphragm type pressure gauge, but this has not been possible due to the fact that some applications of pressure gauges require the fluid pressure connection to be made to the rear of the gauge, while still other applications require a fluid pressure conduit connection to enter the gauge at a side or radial location. This difference in direction of connection obviously complicates the design of the brass case and generally results in the necessity of having one brass casting made up for rear mounted fluid connections and a different brass casting made up for side or radially mounted fluid connections.

The mounting of the flexible diaphragm provides another problem for the users of brass or similar metallic materials to form the case for the gauge. It is necessary, of course, for the periphery of the diaphragm to be sealed to the case to form a pressure chamber to receive the pressured fluid to be measured. This has generally been accomplished by utilizing a circular metallic plate which compresses an organic gasket between the periphery of the diaphragm and an annular surface formed in the metallic case. To maintain the clamping plate in such sealing relationship, it is necessary to provide a large number of peripherally spaced screws or bolts, generally at least six. This results in a time consuming assembly operation.

The securement of the clamping plate to the brass case by means other than bolts, such as by spot welding of the metallic plate to the metallic case is a practical impossibility due to the fact that the diaphragm and gasket are formed of materials which cannot withstand the high temperatures developed during a conventional welding operation at a location closely adjacent such components.

Additionally, such prior art cases were provided with a plurality of peripherally spaced, internally projecting bosses which were machined to provide internal threads. The movement mechanism of the gauge was secured by bolts to said bosses.

There is, therefore, a definite need for an improved design of a case and clamping element for a diaphragm type fluid pressure gauge which will (1) provide a single case for both back or side mounted fluid connections, (2) eliminate the use of brass or similar metallic materials, yet provide the same rigidity and corrosion resistance as was possible by utilizing corrosion resistant metals such as brass, (3) expedite the assembly of the diaphragm clamping element to the case, and (4) eliminate the machining of bosses in the case.

SUMMARY OF THE INVENTION

The invention contemplates forming the case of a diaphragm type gauge and a clamping ring for mounting the diaphragm in the case from an organic thermoplastic material, preferably thermoplastic materials which have sufficient rigidity to fixedly secure the diaphragm within the case and to provide a rigid mounting for the conventional movement mechanism by which axial deflections of the central portions of the diaphragm are translated into an angular movement of a pointer traversing a circular dial.

In accordance with this invention, the case comprises a generally cup-shaped element formed of a moldable thermoplastic material and having an annular wall which is integrally secured to a base portion. The base portion is provided with an axially thickened central portion which is not necessarily circular in configuration but does define a chamber having an open end circumscribed by an annular, radial sealing surface formed on the inner portions of the base portion of the plastic case. An axial flange surrounds the annular sealing surface. An annular gasket cooperates with the annular sealing surface and is compressed into sealing relationship with the annular sealing surface by the peripheral portions of a circular flexible diaphragm, thus closing the open end of the aforementioned chamber to form a fluid pressure chamber in one axial end of the base.

A clamping or retaining ring is formed from the same or similar moldable thermoplastic material as the case and has an annular radial surface on the one side which is abuttable with the periphery of the circular diaphragm. The same side of the clamping ring is provided with a radially projecting flange having a small triangular cross-section, annular projection formed thereon, the vertex of which abuts against the radial end face of the aforementioned axial flange formed on the bottom portion of the plastic case in surrounding relationship to the annular sealing surface. Heat is then generated in the triangular projection ring sufficient to cause such projection to melt and integrally unite with the abutting axial flange of the base portion of the plastic case. Such action, which will be hereinafter described as "melt-welding" can be conveniently accomplished through the application of a conventional ultrasonic tool which produces high frequency vibrational impacts of the annular triangular projection against the axial flange of the plastic case resulting in the melting and bonding of the adjacent plastic surfaces. The periphery of the diaphragm is thus secured in sealing relation with the annular sealing surface of the plastic case by the interposed annular gasket.

The other side of the clamping ring is provided with peripherally spaced holes in which cylindrical nuts are melt-welded for the mounting of any conventional movement mechanism. Such movement mechanisms are well known in the prior art and effect a translation of axial movements of the central portion of the flexible diaphragm into an angular movement of a pointer relative to a fixed circular dial plate bearing pressure indications. The details of the movement mechanism form no part of this invention since anyone of a large number of known mechanisms could be employed with the plastic case and clamping ring embodying this invention.

To apply fluid pressure to the chamber defined between the bottom of the plastic case and the face of the diaphragm, this invention contemplates providing in the axially thickened bottom portion of the plastic case, both a central, outwardly opening recess and a radially disposed outwardly opening recess. The recesses are both sized to receive a conventional socket for connection to a fluid pressure conduit leading to a source of fluid pressure (or vacuum) to be measured. The central recess preferably has its axis concentric with the axis of the diaphragm and hence provides a convenient rear access for connecting the fluid pressure conduit. The radially disposed recess provides a side access. Whichever recess is selected, a hole is then bored or punched through the bottom of the selected recess which places the interior of the recess in fluid communication with the pressure chamber and thus effects a direct connection between the source of fluid pressure (or vacuum) to be measured by the gauge and the fluid pressure chamber adjacent the rear side of the flexible diaphragm.

If desired, the fluid conduit connections may be formed of brass and may be melt-welded in the selected recess, again through the application of ultrasonic energy to the brass component. One or more knurled rings on the brass connection are snugly frictionally engaged with the wall of the selected recess. Ultrasonic energy applied to the metallic component causes a melt-welding of the inner surface of the plastic recess with the knurled rings, thus sealably securing the metallic component in the selected recess.

Further advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
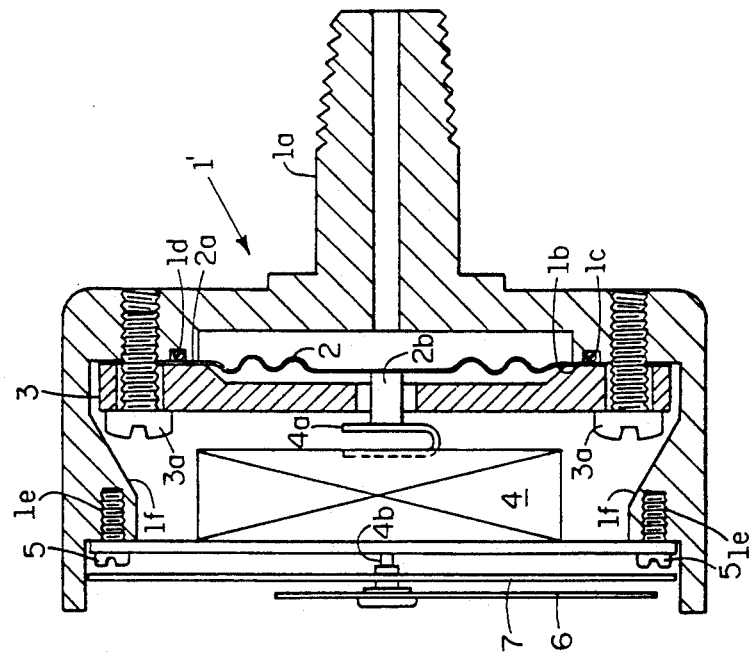
FIGS. 1 and 2 show vertical cross-sectional views of prior art diaphragm type fluid pressure gauges respectively having bronze casings with rear and side connections to the conduit supplying fluid pressure to be measured.
Figure 2:
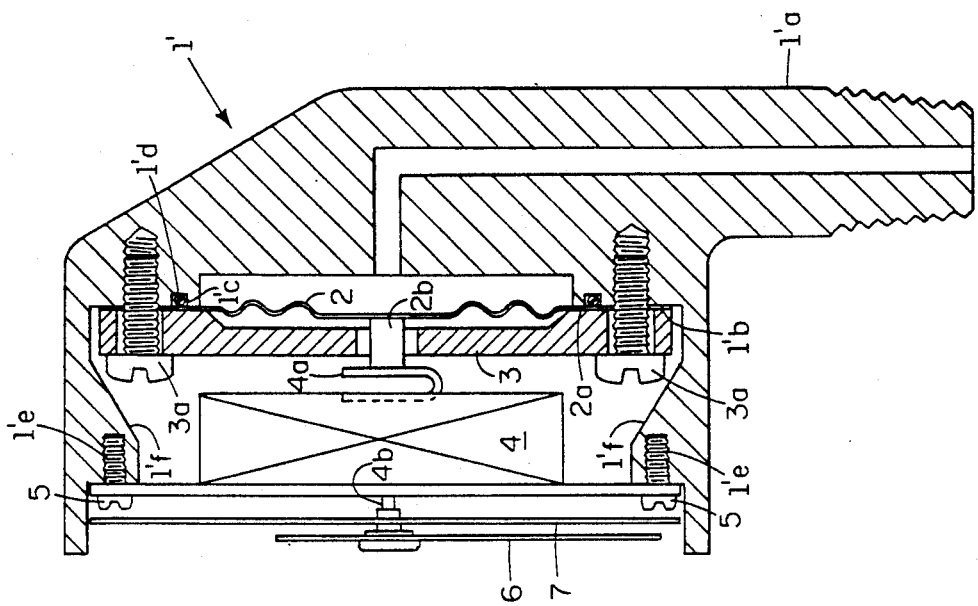

In order to thoroughly appreciate the advantages of the present invention, it is believed desirable to illustrate two prior art constructions of a diaphragm type fluid pressure gauge. Referring to FIGS. 1 and 2 of the drawings, there is shown two prior art diaphragm gauge constructions which differ from each other only in that the gauge of FIG. 1 is connectable at the rear of the gauge to a fluid conduit leading to the source of fluid pressure, while in FIG. 2, the connection to a source of fluid pressure to be measured is through a conduit entering the gauge at a radial position, generally at the bottom of the gauge.

Thus in FIG. 1, the main structural element of the gauge is a brass casting 1 which has an axially projecting socket 1a formed on its rear central portion to receive a connection to a fluid conduit (not shown). In FIG. 2, the corresponding element comprises a brass casting 1' having a socket element 1'a extending radially from the lower side of the main body portion of the brass casting 1'. The brass casting 1 further defines an annular diaphragm mounting surface 1b and a similar surface 1'b is formed on the modification of FIG. 2.

A circular flexible diaphragm 2 has its periphery 2a abutting a gasket ring 1c or 1'c which in turn is seated in an annular recess 1d or 1'd on the mounting surface 1b of FIG. 1 or 1'b of FIG. 2. A circular plate 3 abuts the diaphragm periphery 2a. A plurality of peripherally spaced bolts 3a, preferably at least six, traverse the outer peripheral portion of plate 3 to engage cooperating threaded holes in the mounting surfaces 1b or 1'b, thus sealingly mounting the diaphragm 2 to the brass casting 1 or 1' as the case may be.

A movement mechanism 4, which is entirely conventional and will not be shown in detail, is mounted by bolts 5 in peripherally spaced threaded holes 1e which are formed in integral bosses 1f in the wall of casting 1. Such movement mechanism is engaged by an axial projection 2b formed on the outer face of the diaphragm 2 which projects through a central hole 3b in circular plate 3 and engages a U-shaped force transmitting element 4a and converts axial movements of the force transmitting element 4a into angular rotation of a shaft 4b. A pointer 6 is secured to the shaft 4b and cooperates with indicia (not shown) on a circular dial 7 which is suitably mounted within the open end of brass casting 1 or 1'. The indicia provided on the dial 7 indicates the pressure (or vacuum) supplied to the inner side of the diaphragm 2. The movement mechanism 4 accurately translates axial displacements of the central portion of diaphragm 2 into angular movements of the pointer 6 relative to the dial 7 to indicate the pressure or vacuum being measured.

From the foregoing description, it will be readily apparent that the prior art constructions required separate brass castings for the main structural elements of the gauge depending upon whether the fluid pressure input was to be supplied to the back of the gauge or at a radial position with respect to the gauge. Furthermore, the sealed securement of the diaphragm to the brass casting was accomplished by the laborious tightening of six bolts, and threaded holes had to be machined in the internal bosses 1f or 1'f.

Figure 5:
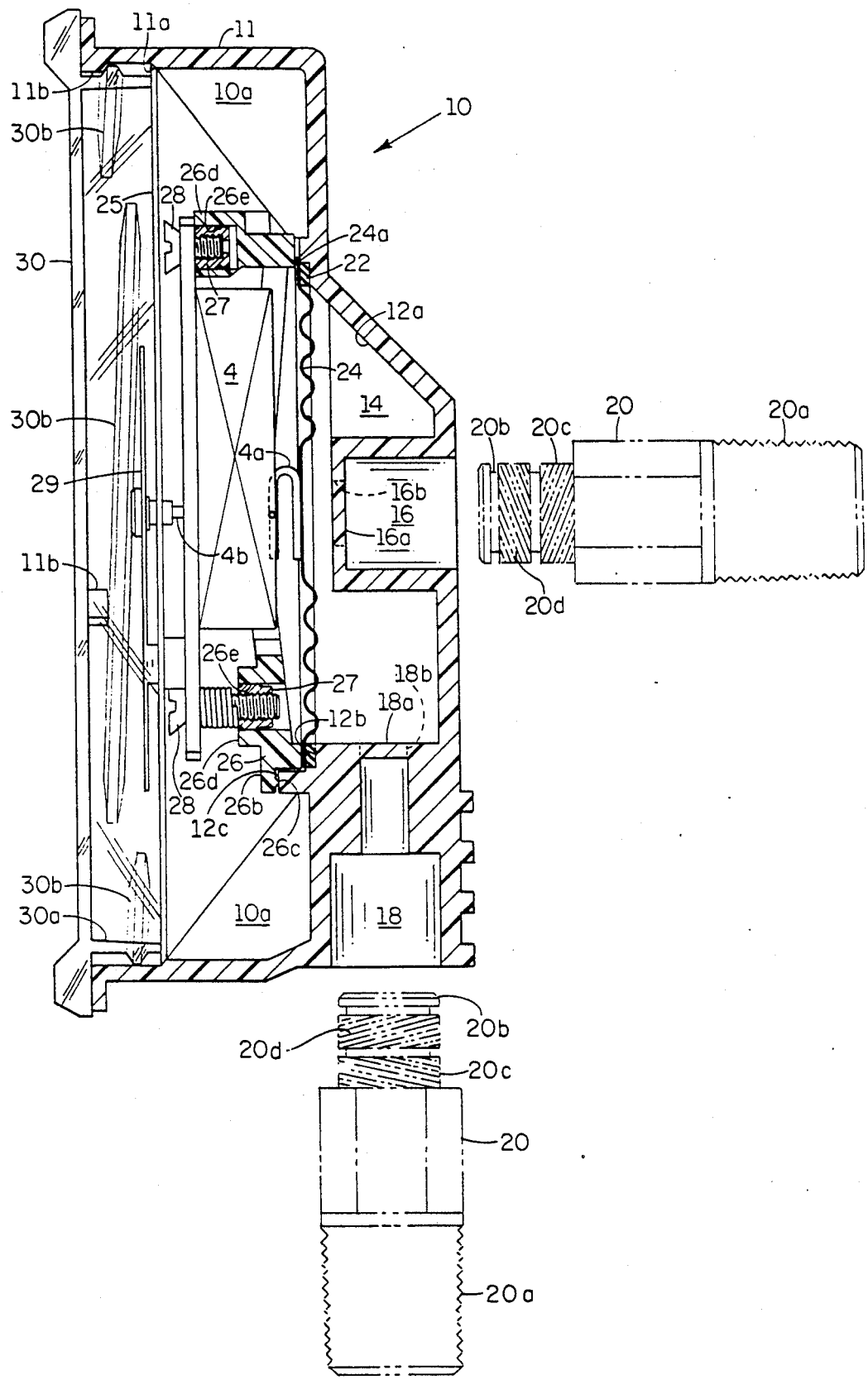
FIG. 5 is an enlarged scale sectional view taken on the plane 5—5 of FIG. 3.
Figure 6:
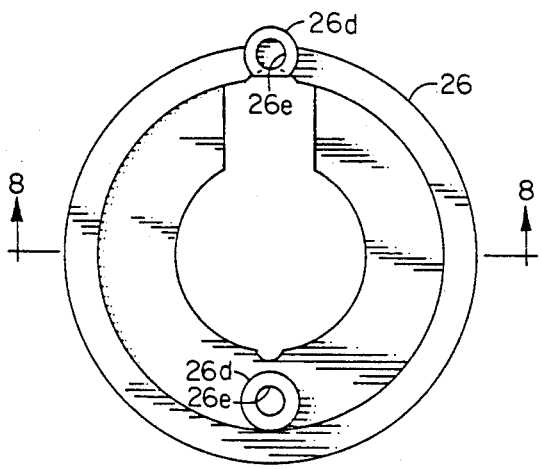
FIG. 6 is a rear elevational view of the clamping ring.

Referring now to FIG. 5, there is shown in vertical section, a diaphragm type fluid pressure gauge comprising a generally cup-shaped body element 10 formed of a substantially rigid thermoplastic material having recognized corrosion resistant properties. Suitable materials from which the body element 10 may be formed comprise Acrylonitrile Butadine Styrenes, commonly known as A.B.S., and preferably the heat resistant KJB grade.

Figure 4:
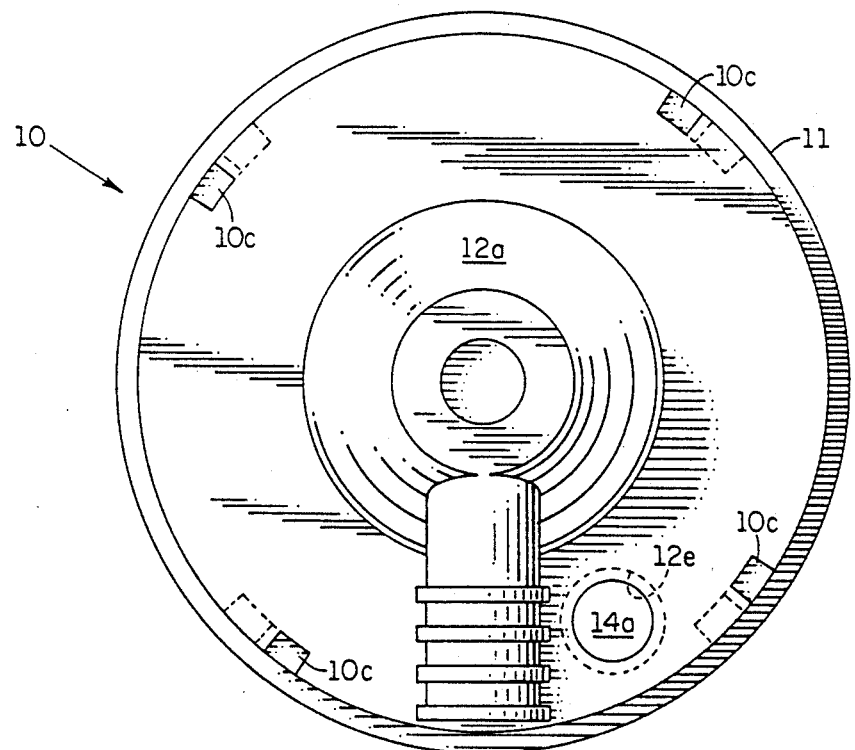
FIG. 4 is a rear elevational view of the gauge of FIG. 3.

The cup-shaped body element 10 has an annular side wall 11 which is integrally connected to a bottom wall 12 which is axially enlarged as indicated at 12a to define a fluid pressure chamber 14. The bottom wall enlargement 12a also defines an outwardly facing central axial recess 16 having a bottom wall 16a forming a wall of the fluid pressure chamber 14. Additionally, the bottom wall enlargement 12a defines a radially disposed, outwardly facing recess 18 having a bottom wall 18a which forms a wall of the fluid pressure chamber 14. Radial reinforcing ribs 10a and 10b may be incorporated within body element 10. Ribs 10b permit bayonet type mounting slots 10c (FIG. 4) to be formed in the case 10 adjacent its closed end.

Figure 9:
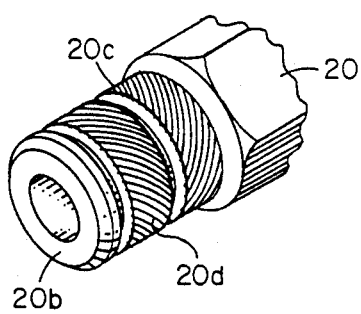
FIG. 9 is an enlarged scale perspective view of the plug end of a brass coupling.

The recesses 16 and 18 are respectively sized to receive a suitable socket 20 which is utilized for effecting a sealed connection to a fluid pressure conduit (not shown). Socket 20, which is preferably formed of brass or other corrosion resistant metal, has an externally threaded end 20a for connection to a fluid pressure conduit (not shown). A plug end 20b is formed on the opposite end of socket 20 and a pair of axially spaced enlarged knurled shoulders 20c and 20d are formed thereon. The knurlings on shoulders 20c and 20d are preferably oppositely inclined (FIG. 9). Shoulders 20c and 20d are sized to snugly and frictionally engage either the internal surface of the recess 16 or 18 as the case may be. Application of ultrasonic energy to socket 20 will cause the melting of the plastic surfaces adjacent to knurled shoulders 20c and 20d and thus affect the sealed securement for the socket 12 in the selected recess. The plastic flow into the bi-directional knurlings provides torquing resistance. Whichever recess is selected to receive the socket, that recess is first opened to the fluid pressure chamber 14 by removing a portion of the bottom wall 16a or 18a as the case may be, as indicated by the dotted lines 16b and 18b. It will thus be readily apparent that the main body element 10 may have a fluid pressure inlet disposed at the central rear portion of the gauge or at any radial position relative to the gauge.

Figure 3:
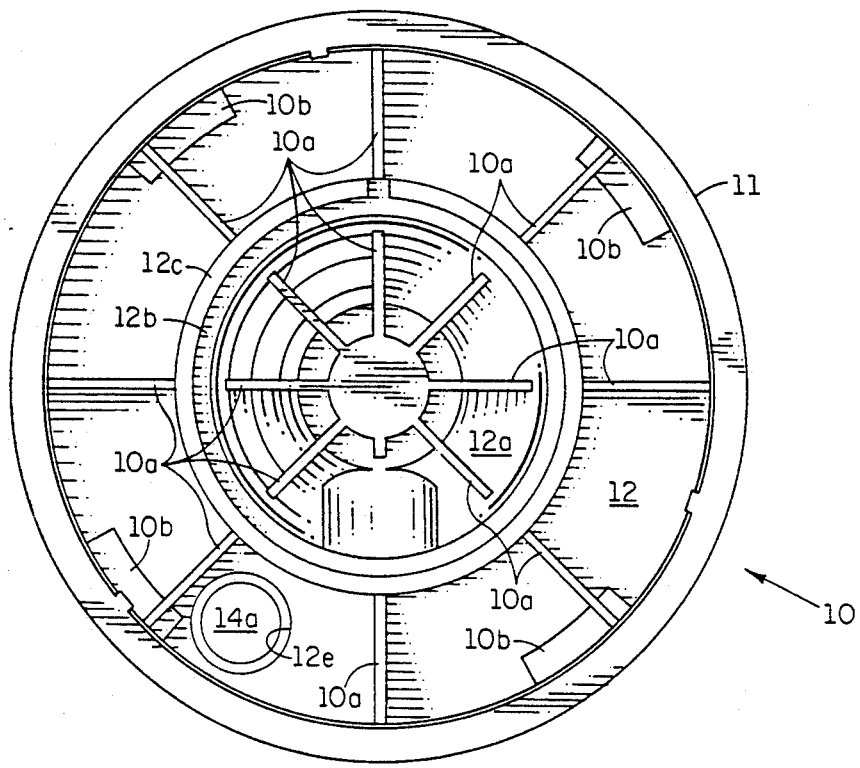
FIG. 3 is a front elevational view of a fluid pressure gauge embodying this invention.

The inner portions of the fluid pressure chamber 14 are encircled by a radial gasket seating surface 12b formed on the bottom wall 12 of the main body element 10. A gasket ring 22 engages such surface and is held in sealed engagement therewith by the peripheral flange 24a of a conventional circular diaphragm 24. Thus the fluid pressure chamber 14 is isolated from ambient pressure and will be maintained at the fluid pressure or vacuum supplied to it through either the recess 16 or 18. If desired, a blowout plug 14a (FIG. 3) for fluid pressure chamber 14 may be snapped into a hole 12e provided in bottom wall 12.

Figure 7:
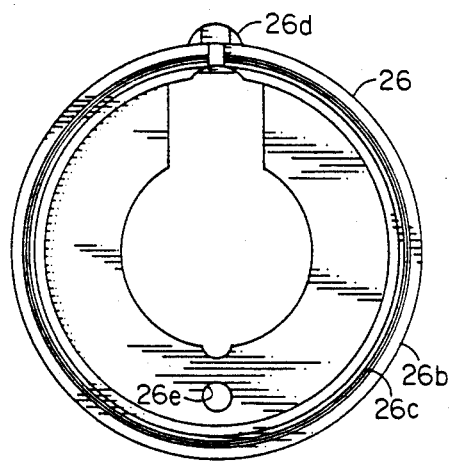
FIG. 7 is a front elevational view of the clamping ring.
Figure 8:
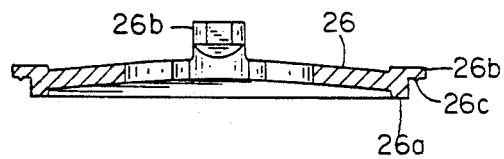
FIG. 8 is a sectional view taken on the plane 8—8 of FIG. 6.

The peripheral rim 24a of a conventional flexible diaphragm 24 is secured in clamping relationship to the annular gasket 22 by a clamping ring 26 which is preferably formed of the same or similar plastic material as the main base element 10. The one face of clamping ring 26 is provided with an annular radial surface 26a (FIG. 7) which engages the periphery 24a of the circular diaphragm 24. Additionally, at a location radially outside the periphery of the diaphragm 24 and the gasket 22, the clamping ring 26 is provided with a radial flange 26b on which is formed a small triangular cross-section, axially projecting rib 26c, the vertex of which engages a cooperating annular radial surface 12c (FIG. 3) integrally formed on the bottom wall 12 of the main frame element 10. Through the application of ultrasonic energy to the clamping ring 26 by a conventional circular horn, the vertex of the rib 26c is melted to achieve a bond with the cooperating surface 12c of the plastic case, thus integrally uniting the clamping ring 26 to the plastic case 10. Alternatively, the triangular projection rib 26c may be peripherally segmented and ultrasonic energy applied to only three or four peripherally spaced regions of the rib 26c. Obviously, this welded securement eliminates the necessity for inserting and tightening a plurality of bolts that are employed for this purpose in the prior art constructions of FIGS. 1 and 2.

The clamping ring 26 is further provided with a pair of diametrically spaced axial projections 26d defining apertures 26e in which cylindrical metal nuts 27 are melt-welded, preferably prior to assembly of ring 26 to body element 10. Nuts 27 respectively receive mounting bolts 28 to effect the mounting of a conventional movement mechanism 4 on the clamping ring 26 with the force transmitting element 4a of such movement mechanism being disposed in abutting engagement with central portion of the outer face of the circular diaphragm 24. A circular dial 25 bearing pressure indicia around its periphery is mounted against a shoulder 11a formed in the axially outermost portions of the annular wall 11 of case 10 by a transparent plastic cover element 30. The output shaft 4b of the movement mechanism 4 drives a pointer 29 to cooperate with the dial 25 to indicate the pressure differential between that existing in the fluid pressure chamber 14 and the ambient pressure.

Preferably, the cover plate 30 is provided with an axially extending flange 30a which has thread segments 30b formed at intervals around its periphery. Peripherally spaced internal projections 11b on the rim portion of body element 10 cooperate with thread segments 30a to secure the cover plate to the plastic body element 10, thus protecting the internal components of the gauge from contaminates.

It will therefore be apparent to those skilled in the art that a diaphragm type fluid pressure gauge embodying this invention provides distinct advantages over the prior art constructions. A single plastic case member can function to provide either a rear central fluid pressure access to the gauge or a radial access to the gauge. The diaphragm is secured in position by ultrasonic welding of two plastic components. This invention not only reduces by one half the number of main case elements required for the manufacture of the gauges, but also permits the assembly of the gauges in a more efficient and more rapid manner through the utilization of ultrasonic energy to achieve the melt welding of the plastic supporting ring to the plastic main base element.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A diaphragm operated, fluid pressure gauge comprising, in combination:
   a molded thermoplastic case having a generally cup-shaped configuration with an annular side wall and an integral base portion;
   said base portion defining a chamber having an open end defined by an annular sealing surface;
   an annular gasket sealable on said annular sealing surface;
   a circular diaphragm having a peripheral rim portion abuttable with said annular gasket;
   a thermoplastic retaining ring having two radial side surfaces, one of said radial side surfaces being abuttable with said peripheral rim portion of said diaphragm to clamp said peripheral rim portion of said diaphragm to clamp said peripheral rim portion in sealing engagement with said annular gasket and said annular gasket in sealing relation with said annular sealing surface;

said thermoplastic retaining ring being melt-welded to said base portion at a plurality of peripheral regions radially outside said gasket;

means on the other of said retaining ring radial side surfaces for mounting a pointer operating movement in operative relationship with the central portions of said diaphragm; and means in said base portion defining a fluid passage between said chamber and a source of fluid pressure to be measured.

2. The apparatus defined in claim 1 wherein said means in said base portion defining a fluid passage comprises an outwardly opening recess having an apertured bottom wall, said aperture communicating with said chamber.

3. The apparatus of claim 2 wherein said outwardly opening recess is axially parallel to the axis of said annular seating surface.

4. The apparatus of claim 2 wherein said outwardly opening recess has an axis radially disposed relative to the axis of said annular seating surface.

5. The apparatus of claim 2 further comprising a metallic fluid connector sealably secured in said outwardly opening recess.

6. The apparatus defined in claim 1 wherein said base portion defines a first outwardly opening recess coaxially located relative to said annular seating surface and a second outwardly opening recess having an axis perpendicular to the axis of said annular seating surface;

a selected one of said outwardly opening recesses having an aperture communicating with said chamber; and a metallic fluid connector sealably secured in said selected outwardly open recess, thereby permitting the fluid pressure to be gauged to be selectively applied through the bottom or the side of said integral base portion of said molded plastic case.

7. A diaphragm operated, fluid pressure gauge comprising, in combination:

a molded thermoplastic case having a generally cup-shaped configuration with an annular side wall and an integral base portion;

said base portion defining a central, outwardly opening recess and an inwardly facing annular sealing surface disposed in surrounding relation to the axis of said outwardly opening recess;

an annular gasket sealable on said annular sealing surface;

a circular diaphragm having a peripheral rim portion abuttable with said annular gasket;

a thermoplastic retaining ring having two radial side surfaces, one of said radial side surfaces being abuttable with said peripheral rim portion in sealing engagement with said annular gasket and said annular gasket in sealing relation with said annular sealing surface;

said thermoplastic retaining ring being melt-welded to said base portion at a plurality of peripheral regions radially outside said gasket;

means on the other of said retaining ring radial side surfaces for mounting a pointer operating movement in operative relationship with the central portions of said diaphragm; and fluid passage means communicating between said central outwardly opening recess and the side of said diaphragm opposite to said plastic retaining ring.

8. A diaphragm operated, fluid pressure gauge comprising, in combination:

a molded thermoplastic case having a generally cup-shaped configuration with an annular side wall and an integral base portion;

said base portion defining a central, outwardly opening recess and an inwardly facing annular sealing surface disposed in surrounding relation to the axis of said outwardly opening recess;

an annular gasket sealable on said annular sealing surface;

a circular diaphragm having a peripheral rim portion abuttable with said annular gasket;

a thermoplastic retaining ring having two radial side surfaces, one of said radial side surfaces being abuttable with said peripheral rim portion of said diaphragm to clamp said peripheral rim portion in sealing engagement with said annular gasket and said annular gasket in sealing relation with said annular sealing surface;

said thermoplastic retaining ring being melt-welded to said base portion at a plurality of peripheral regions radially outside said gasket;

means on the other of said retaining ring radial side surfaces for mounting a pointer operating movement in operative relationship with the central portions of said diaphragm;

said base portion further defining a radial outwardly opening recess;

a fluid conduit connector selectively sealably insertable in either said central or said radial recess; and a fluid passage formed in the bottom of the recess selected for insertion of said fluid conduit connector, said fluid passage communicating with the side of said diaphragm opposite said retaining ring.

9. The apparatus of claim 7 wherein the axis of said central outwardly open recess is concentric with the axis of said annular seating surface.

10. The apparatus of Claim 1, 2, 7 or 8 further comprising a transparent circular gauge cover; and means on the rim of said annular wall of said molded plastic case for mounting said transparent circular gauge cover.

11. The apparatus of Claim 1, 2, 7 or 8 wherein said peripheral regions of melt-welding is determined by a triangular cross-section annular rib formed on one of the adjacent surfaces of said base portion and said retaining ring prior to melt-welding.

12. The apparatus of Claim 1, 2, 7 or 8 further comprising an axial flange formed on said thermoplastic base in surrounding relation to said annular seating surface, the radial surface of said axial flange being secured to said thermoplastic retaining ring by said melt-welding.

* * * * *